United States Patent [19]

Reed

[11] Patent Number: 4,627,594
[45] Date of Patent: Dec. 9, 1986

[54] MUDFLAP MOUNTING ASSEMBLY

[76] Inventor: Jesse L. Reed, RD #1, Wendell Rd., New Salem, Mass. 01364

[21] Appl. No.: 746,255

[22] Filed: Jun. 18, 1985

[51] Int. Cl.$^4$ ............................................. B62D 25/16
[52] U.S. Cl. ................................ 248/632; 280/154.5 R
[58] Field of Search ............... 248/560, 580, 599, 609, 248/615, 618, 632, 633, 634, 635, 214, 251; 280/154, 154.5 R; 267/141; D12/184–185; 403/203, 220, 221, 224, 225

[56] References Cited

U.S. PATENT DOCUMENTS

| | | | |
|---|---|---|---|
| 139,948 | 6/1873 | Doremus | 248/632 |
| 1,899,596 | 2/1933 | Stein | 403/224 |
| 2,032,909 | 3/1936 | Braden | 248/632 |
| 2,129,124 | 9/1938 | Geyer | 248/632 |
| 3,401,953 | 9/1968 | Prohl | 280/154.5 R |
| 3,711,119 | 1/1973 | Hollingsworth | 280/154.5 R |
| 3,848,842 | 11/1974 | Jepsen | 248/560 |
| 3,954,281 | 5/1976 | Juergens | 280/154.5 R |
| 3,999,776 | 12/1976 | Betts, Sr. | 280/154.5 R |
| 4,007,944 | 2/1977 | Dingess | 280/154.5 R |
| 4,189,165 | 2/1980 | Leonard | 280/154.5 R |
| 4,354,690 | 10/1982 | Hanson | 280/154.5 R |
| 4,377,294 | 3/1983 | Lockwood | 280/154.5 R |
| 4,421,333 | 12/1983 | Van Dyke | 248/291 |
| 4,453,728 | 6/1984 | Verge | 280/154.5 R |

Primary Examiner—J. Franklin Foss
Assistant Examiner—Robert A. Olson
Attorney, Agent, or Firm—Salter & Michaelson

[57] ABSTRACT

A mounting assembly for mounting a mudflap on a vehicle comprises an elongated rigid bracket member having a longitudinally extending channel formed in one end thereof, a resilient pad element, a pedestal member comprising an elongated rigid pedestal element and means for securing the bracket member, the pedestal member and the pad element in assembled relation, wherein the pad and the pedestal element are received in the channel and the pad element is compressed between the pedestal element and the bracket member. For use of the mounting assembly, a mudflap is secured to the bracket member and the pedestal member is secured to the frame or chassis of a vehicle to mount the mudflap thereon. The pad element acts to absorb and dampen shocks and vibrations produced in the bracket member by road conditions so that metal fatigue in the bracket member and the pedestal member is minimized.

5 Claims, 5 Drawing Figures

MUDFLAP MOUNTING ASSEMBLY

BACKGROUND AND SUMMARY OF THE INVENTION

The instant invention relates to accessories for vehicles and more particularly to a mounting assembly for mounting a mudflap on a vehicle.

In order for a mounting assembly for a mudflap to be effective, it must be rugged and durable enough to withstand prolonged exposure to the shocks and vibrations which are produced by various types of road conditions, but it must nevertheless be adapted for relatively inexpensive constructions in order to make it practical. Generally, the heretofore known mudflap mounting assemblies have comprised a mounting arm which is adapted to receive a mudflap thereon, and a flange or the like which is permanently attached to one end of the arm for mounting the assembly on the chassis or frame of a vehicle. It has been found, however, that the arms of mounting assemblies of this general type frequently bend or break after prolonged exposure to the shocks and vibrations which are created by road conditions. Specifically, it has been found that when mudflaps which are inherently relatively heavy are supported by mounting assemblies of this type, the arm portions of the mounting assemblies tend to break due to metal fatigue after prolonged use. Further, it has been found that in order to overcome this problem, it is necessary to make mounting assemblies of this type so rugged that they are heavy and expensive, and therefore impractical for many applications.

Over the years, a number of different types of mounting assemblies have been developed in order to overcome the problem of breakage due to prolonged exposure to shocks and vibrations, as well as to overcome various other problems which have been found to exist with mudflap mounting assemblies. In this regard, the U.S. patents to JEPSEN, U.S. Pat. No. 3,848,842, BETTS, Sr., U.S. Pat. No. 3,999,776, LEONARD et al, U.S. Pat. No. 4,189,165, HANSON, U.S. Pat. No. 4,354,690, VAN DYKE, U.S. Pat. No. 4,421,333, and VERGE, U.S. Pat. No. 4,453,728, disclose a variety of different types of mudflap mounting assemblies which represent the closest prior art to the instant invention of which the applicant is aware. However, many of the devices disclosed in these references have relatively complicated constructions which make them expensive and impractical for most applications, and generally the devices disclosed in these references fail to solve the problem of providing a mudflap mounting assembly which is durable and also adapted for relatively inexpensive constructions.

The instant invention provides an effective mounting assembly for a mudflap which overcomes the problem of metal fatigue experienced with many of the heretofore known mounting assemblies and which is also adapted for relatively inexpensive constructions. The mounting assembly of the instant invention comprises an elongated rigid bracket member which is adapted to receive a mudflap thereon, a pedestal member which is adapted to be mounted on a vehicle, a resilient pad means which overlies a portion of the pedestal member, and means for securing the bracket member on the pedestal member so that the pad means is compressed between the pedestal member and the bracket member. The bracket member is formed with a longitudinally extending inner surface thereon which defines a longitudinally extending channel therein. The pedestal member comprises a mounting plate or flange for securing it on a vehicle and an elongated pedestal element having an outer pedestal element surface thereon which is formed in a configuration which is preferably generally complimentary to the configuration of the channel in the bracket member. The pad means is received on the pedestal element, and the pedestal element is dimensioned to be received in the channel with the pad means on the outer pedestal element surface. The securing means of the mounting assembly is operative for securing the bracket member on the pedestal element so that when the pedestal element is received in the channel in the bracket member, the pad means is compressed between the pedestal element and the bracket member. Accordingly, when the pedestal member is mounted on the chassis or frame of a vehicle so that the bracket member extends outwardly in a generally horizontal disposition, it is not prone to breakage in the manner of the heretofore known mounting assemblies. In this regard, the pad means provides a cushion between the bracket member and the pedestal member which reduces metal fatigue in both the bracket member and the pedestal member. Further, because the pedestal element is received in the channel in the bracket member, when the mounting assembly is mounted on a vehicle so that the channel in the bracket member faces generally downwardly and the bracket member extends outwardly in a generally horizontal disposition adjacent a tire on the vehicle, the pedestal member firmly supports the bracket member in a manner which substantially prevents both vertical movement and front to rear movement of the bracket member with respect to the vehicle.

In the preferred embodiment of the mounting assembly of the instant invention, the bracket member comprises longitudinally extending first, second and third wall portions which cooperate to define an elongated longitudinally extending channel of generally rectangular sectional configuration in the bracket member. Further in the preferred embodiment, the pedestal member is formed so that the pedestal element has first, second and third longitudinally extending surfaces thereon which cooperate to define the outer pedestal element surface and which are oriented so that the first and third surfaces extend outwardly in slightly diverging relation from the second pedestal element surface, whereby the first, second and third pedestal element surfaces cooperate to define a generally trapezoidal sectional configuration in the pedestal element. Also in the preferred embodiment, the means for mounting the bracket member on the pedestal element is operable for securing the bracket member thereon along a single axis which intersects the second surfaces of the bracket member and the pedestal element and it operates by drawing the second surfaces of the bracket member and the pedestal element together to compress the pad means therebetween and to thereby also compress the pad means between the first surfaces of the pedestal element and the bracket member and the third surfaces of the pedestal element and the bracket member. Specifically, when the pedestal element is constructed so that the first and third pedestal element surfaces diverge outwardly slightly in their extents from the second pedestal element surface, and the securing means is applied to draw the second pedestal element and bracket member surfaces together, a first compression area is created between the second surfaces of the pedestal element and the bracket member, and two additional compression areas are created between the longitudinal edge portions of the first surfaces of the pedestal element and the bracket member and the longitudinal edge portions of the third surfaces of the pedestal element and the bracket member. As a result of these three compression areas and the fact that the securing means secures the bracket member to the pedestal element along a single axis which intersects the second surfaces of the pedestal element and the bracket member, when the mounting assembly is mounted on a vehicle the bracket member is firmly mounted but nevertheless at least slightly resiliently yieldable both vertically and laterally with respect to the pedestal element, and any shocks or vibrations which occur in the bracket member are dampened by the pad means to reduce the occurrence of metal fatigue in the pedestal member and the bracket member. However, because the pedestal member and the bracket member can be effectively constructed in relatively simple configurations, the mounting assembly of the instant invention is effectively adapted for relatively inexpensive constructions.

Accordingly, it is a primary object of the instant invention to provide a durable mounting assembly for a mudflap which is nevertheless adapted for relatively inexpensive constructions.

Another object of the instant invention is to provide a mounting assembly for a mudflap which is not prone to excessive metal fatigue due to the adverse effects of vibrations and shocks caused by road conditions.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
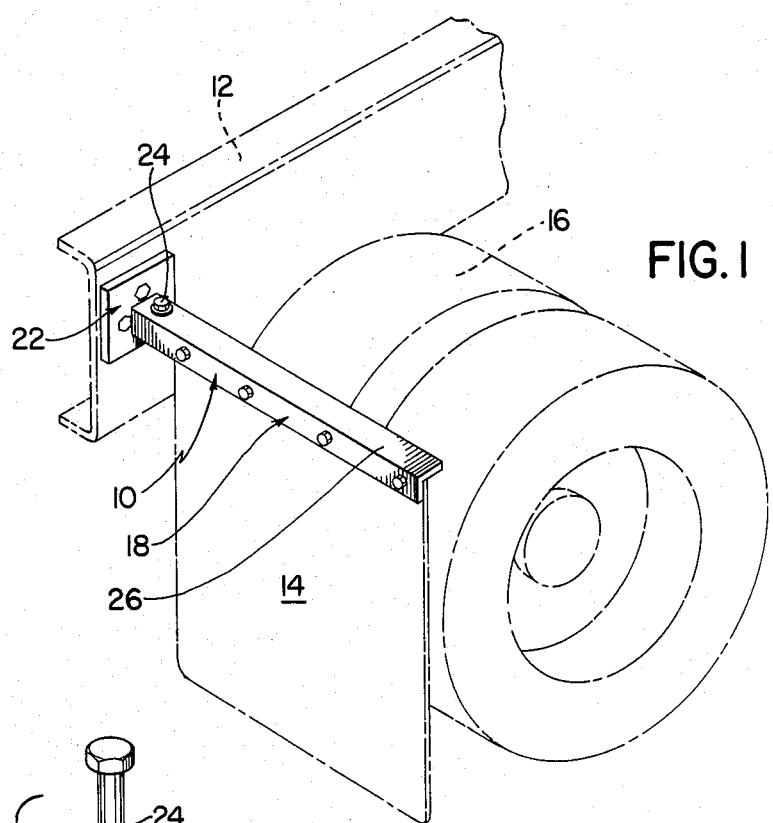
FIG. 1 is a perspective view of the mounting assembly of the instant invention mounted on the frame of a vehicle.

Referring now to the drawings, the mounting assembly of the instant invention is illustrated in FIGS. 1 through 5 and generally indicated at 10. As illustrated in FIG. 1, the mounting assembly 10 is securable on a frame 12 of a vehicle for mounting a mudflap 14 thereon so that the mudflap 14 is positioned behind a pair of tires 16 on the vehicle to provide a splash guard for the tires 16. The mounting assembly 10 comprises a bracket member generally indicated at 18, a pad element 20, a pedestal member 22, and a connecting bolt 24 which is operative in combination with a washer 24a and nut 25 for securing the bracket member 18 to the pedestal member 22 so that the pad element 20 is compressed therebetween. Accordingly, when the mounting assembly 10 is mounted on a vehicle, the bracket member 18 is at least slightly resiliently yieldable with respect to the pedestal member 22 so that any shocks or vibrations which are produced in the bracket member 18 are dampened by the pad element 20 to prevent metal fatigue in the bracket member 18 and the pedestal member 22.

The bracket member 18 preferably comprises an elongated angle member 26 and a reduced inner angle member 27 which is received in and secured to the angle member 26 so that the angle members 26 and 27 cooperate to define a longitudinally extending channel of substantially rectangular section in the inner end portion of the bracket member 18, the channel in the bracket member being defined by first, second, and third interior bracket member surfaces 28, 30, and 32. In this regard, however, while in the preferred embodiment of the mounting assembly of the instant invention the channel which is formed in the bracket member 18 has a generally rectangular cross section, it will be understood that other embodiments of the mounting assembly comprising bracket members having channels of other sectional configurations, such as V-shaped or rounded configurations are contemplated. In any case, the bracket member 18 is further formed with an aperture 34 therein which extends through the overlapping or coextensive wall portions of the angle members 26 and 27 so that it extends through the second bracket member surface 30 at a point which is spaced from the inner end of the bracket member 18, and a plurality of apertures 36 extend through the outer portion of the angle member 26 for securing the mudflap 14 thereto.

The pad element 20 comprises a resiliently compressible sheet which is preferably made of a flexible rubberized material having a relatively firm rate of compressibility. The pad element 20 preferably has a thickness of between ⅛ and ½ inch and it is formed with an aperture 38 therethrough for receiving the bolt 24 when the pad element 20 is received in assembled relation in the assembly 10 wherein it is received on the surfaces 28, 30, and 32 as illustrated in FIG. 5.

Figure 2:
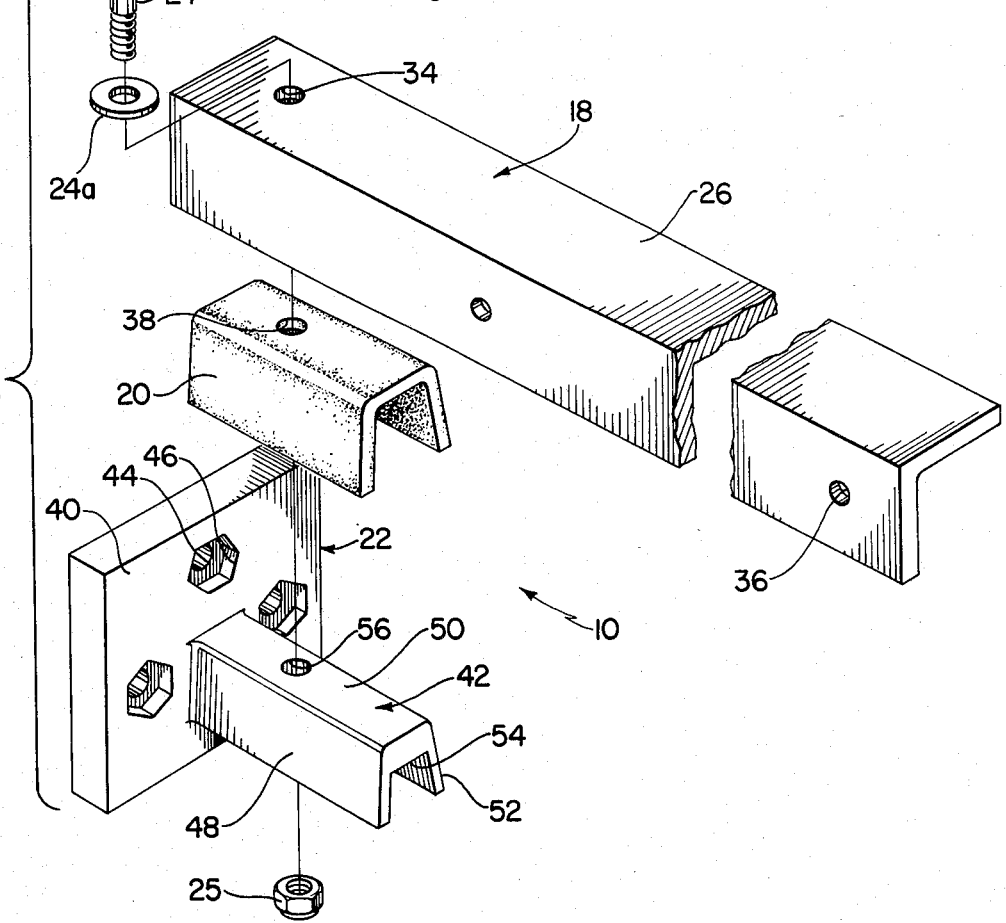
FIG. 2 is an exploded perspective view of the mounting assembly.
Figure 3:
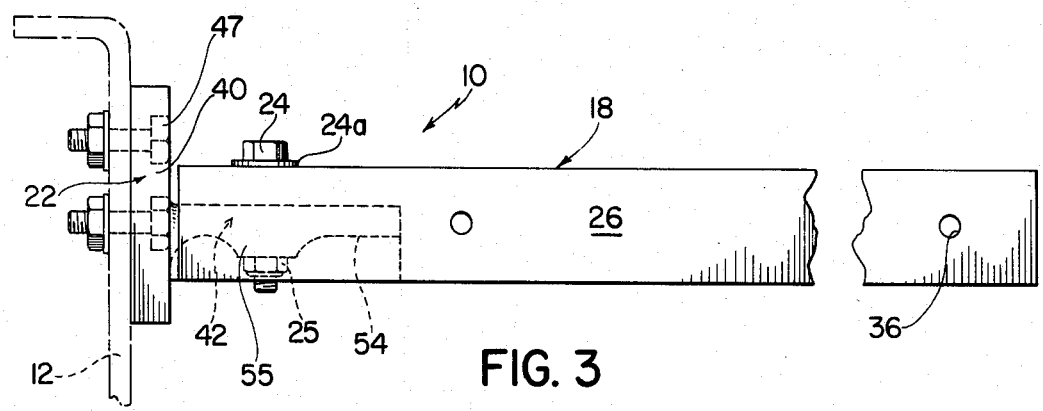
FIG. 3 is a side elevational view of the mounting assembly.
Figure 4:
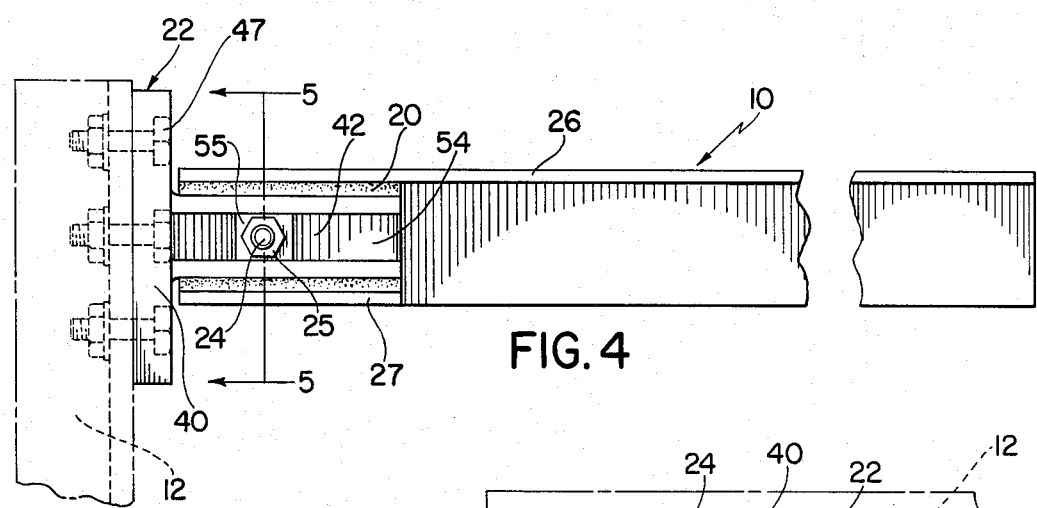
FIG. 4 is a bottom plan view thereof.

The pedestal member 22 comprises a flange or mounting plate 40 which is adapted to be mounted on the frame 12 of a vehicle and an elongated pedestal element generally indicated at 42 which is preferably integrally formed with the flange 40 so that it extends outwardly in substantially perpendicular relation therefrom. The pedestal member 22 is preferably cast from a suitable rigid metal, such as steel, and it is preferably formed with a plurality of mounting holes 44 therethrough for securing the pedestal member 22 on the frame 12 with mounting bolts 47, the holes 44 preferably being formed in the hexagonal sockets 46 therein for receiving the heads of the bolts 47 as illustrated in FIG. 5. The pedestal element 42 is preferably formed so that it has first, second and third outer pedestal element surfaces 48, 50, and 52, respectively, thereon, and it is dimensioned and configured to be received in the channel defined by the angle members 26 and 27 of the bracket member 18 with the pad element 20 interposed between the bracket member 18 and the pedestal element 42. In this regard, however, as illustrated in FIGS. 2 and 5, the surfaces 48 and 52 of the pedestal element 42 are preferably formed so that they diverge outwardly slightly with respect to each other in their extents from the second pedestal element surface 50 to define a trapezoidal cross-sectional configuration in the pedestal element 42. An interior recess 54 having a shoulder 55 therein is formed in the underside portion of the pedestal element 42 for reducing the weight thereof, and a bore 56 extends through the pedestal element 42 so that it extends in generally perpendicular relation from an intermediate point in the longitudinal extent of the second surface 50 through the shoulders 55 for receiving the bolt 24.

Figure 5:
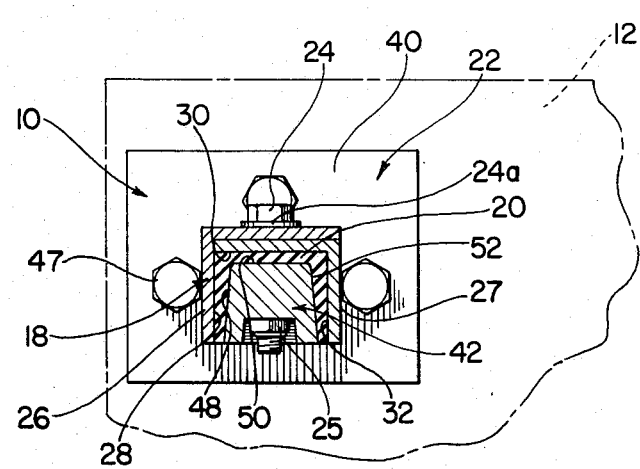
FIG. 5 is a sectional view taken along line 5—5 in FIG. 4.

Referring now to FIGS. 2 and 5, it will be seen that when the mounting assembly 10 is in assembled relation, the pad element 20 overlies the surfaces 48, 50, and 52 of the pedestal element 42 and the bracket member 18 is received over the pad element 20. The bolt 24 is received through the aperture 34, the hole 38, and the bore 56, and the washer 24a and the nut 25 cooperate with the bolt 24 for securing the mounting assembly 10 in assembled relation so that the second pedestal element surface 50 is drawn toward the second bracket member surface 30 by the bolt 24 to compress the pad element 20 between the surfaces 30 and 50. Further, as will be seen, the pad element 20 is also compressed between the longitudinally extending peripheral edge portions of the first bracket member and pedestal element surfaces 28 and 48, respectively, i.e. those portions of the surfaces 28 and 48 which are furthest from the surfaces 30 and 50, respectively, and between similar longitudinally extending peripheral edge portions of the third bracket member and pedestal element surfaces 32 and 52, respectively, as a result of the outwardly diverging relationship of the first and third pedestal element surfaces 48 and 52 in their extents from the second surface 50. Accordingly, the pad element 20 is increasingly compressed in its outward extent away from the surfaces 30 and 50, and when the mounting assembly 18 is fully assembled, three compression areas are formed in the pad element 20, one between the second surfaces 30 and 50, one between the longitudinally extending peripheral edge portions of the first surfaces 28 and 48, and one between the longitudinally extending peripheral edge portions of the third surfaces 32 and 52. Further, since the bracket member 18 is secured to the pedestal element 42 with a single bolt 24, the bracket member 18 is at least slightly resiliently yieldable with respect to the pedestal element 42 by further compressing portions of the pad element 20 between the bracket member 18 and the pedestal element 42. As a result, shocks, vibrations, and even direct impacts to which the bracket member is exposed are cushioned and dampened by the pad element 20 so that they are not directly transmitted to the pedestal element 42, and therefore the tendency for the pedestal member 22 to fail due to metal fatigue is substantially reduced. However, because the bracket member 18 is supported so that it is resiliently yieldable, it cannot move substantial amounts with respect to the pedestal member 22 and therefore it is firmly retained in position adjacent the tires 16 when it is mounted on the frame 12.

It is seen therefore that the instant invention provides an effective and durable mounting assembly for a mudflap. The assembly 10 can be effectively utilized on commercial vehicles, such as tractor trailers, etc., and because of the manner in which the pad element 20 of the assembly 10 is compressed between the bracket member 18 and the pedestal member 22, the bracket member 18 is resiliently yieldable, so that shocks, vibrations, and impacts to which it is exposed are not transmitted directly to the pedestal member 22. Hence, metal fatigue in the mounting assembly 10 is substantially reduced, and the overall durability of the assembly 10 is increased, although because of the simplicity of the assembly 10, it is readily adapted for relatively inexpensive constructions. Hence, it is seen that the mudflap mounting assembly of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A mounting assembly for mounting a mudflap on a vehicle comprising an elongated rigid bracket member adapted to receive a mudflap thereon, said bracket member having an inner end and having an inner surface comprising an upper surface portion and a pair of spaced side surface portions which extend downwardly therefrom and cooperate therewith to define a longitudinally extending channel in said bracket member, resilient pad means in said channel, a pedestal member comprising a mounting portion for mounting said pedestal member on said vehicle and an elongated pedestal element which extends from said mounting portion and has an outer pedestal element surface thereon, said outer pedestal element surface comprising an upper surface portion and a pair of spaced side surface portions which extend downwardly therefrom, said pedestal member being received in said channel so that said pad means is interposed between said pedestal element and said bracket member along the upper and side surface portions of said pedestal element outer surface and said bracket member inner surface, the upper surface portions of said pedestal element outer surface and said bracket member inner surface being dimensioned and configured to be received in substantially mating relation with said pad means therebetween, and means drawing the upper portions of said bracket member inner surface and said pedestal element outer surface together so that said pad means is compressed therebetween, the side surface portions of said bracket member inner surface and said pedestal element outer surface and said pad means being constructed so that when the upper surface portions of said bracket member inner surface and said pedestal element outer surface are drawn together, said pad means is increasingly compressed between the side surface portions of said bracket member inner surface and said pedestal element outer surface in the downward extents thereof away from their respective upper surface portions.

2. In the assembly of claim 1, said channel being of substantially rectangular cross-sectional configuration.

3. In the assembly of claim 1, said securing means being operative along a single axis which intersects said second pedestal element and bracket member surface portions for drawing same together so that said bracket member is resiliently yieldable with respect to said pedestal member.

4. In the assembly of claim 1, said mounting portion comprising a mounting flange which is integrally formed with said pedestal element.

5. In the assembly of claim 2, said pedestal element being of substantially trapezoidal cross-sectional configuration.

* * * * *